UNITED STATES PATENT OFFICE.

ANTONIO DEL GRANDE, OF NAPLES, ITALY, ASSIGNOR TO CHARLES N. ROMAINE AND GEORGE A. MANNIE, BOTH OF PETERSBURG, VIRGINIA.

PREPARING PYROTECHNIC COMPOUNDS.

SPECIFICATION forming part of Letters Patent No. 411,714, dated September 24, 1889.

Application filed January 5, 1889. Serial No. 295,564. (No specimens.)

*To all whom it may concern:*

Be it known that I, ANTONIO DEL GRANDE, a subject of the King of Italy, and a resident of Naples, in the Province of Molisa, Italy, but temporarily residing at Petersburg, in the county of Dinwiddie and State of Virginia, have invented new and useful Improvements in Preparing Pyrotechnic Compounds, of which the following is a specification.

My invention relates to the manufacture of pyrotechnic and similar compounds, and the object thereof is to provide a novel composition of matter for pyrotechnic purposes, and especially adapted for the manufacture of that class of fire-works known under the trade-name of "whistling-bombs," by firing which a clear, shrill, and prolonged note or sound is produced closely resembling that of a steam or other whistle.

My invention consists in a novel method for the production of said compound, whereby I obtain a composition of matter especially adapted to the purpose specified, as hereinafter fully set forth, and then definitely pointed out in the claim.

In preparing said compound I take a quantity of picric acid and dissolve the same in hot water, a sufficient quantity of the latter being employed to effect a complete solution. Into this solution I then stir carbonate of magnesia, adding the latter slowly and agitating the mixture to permit free effervescence of the carbonic-acid gas given up by the magnesia. A separate aqueous solution of nitrate of potash, or, as it commonly termed, "saltpeter," is then formed, and this is poured into or added to the solution of picric acid and magnesia, their union producing a thick flocculent or curdy precipitate of a yellow color, from which the water is separated in any suitable or convenient manner, as by filtration or decantation. The addition of the solution of nitrate of potash produces picrate of potassium and nitrate of magnesia, the former, $C_6H_2(NO_2)_3OK$, being very slightly soluble in water. This picrate of potassium forms the precipitate, the nitrate of magnesia remaining in solution. The precipitate is then subjected to sufficient pressure to expel a considerable percentage of the retained water, the result being a solid yellow substance having a consistency resembling that of new cheese. This substance may be cut or otherwise separated into blocks or pieces of any suitable size and dried, but while still retaining a sufficient proportion of moisture to produce cohesion the separate blocks are subjected to abrasion upon a screen or other similar surface, whereby they are reduced to a granular condition. This powder is then completely dried, after which it is in condition for use.

While the proportions of the ingredients named are susceptible of some variation, I prefer to use the following proportions to produce a powder for whistling-bombs: Of picric acid, having a formula $C_6H_2(NO_2)_3O$, eighteen parts, by weight, may be used, with three parts of carbonate of magnesia $MgCO_3$ and thirty-six parts, by weight, of saltpeter, or nitrate of potash, $KNO_3$. When the compound is used in the manufacture of that class of pyrotechnic signals known as "whistling-bombs," these proportions will be found preferable. When applied to this use, the powder prepared as set forth is packed in a hollow core, substantially in the manner set forth in the Letters Patent granted to George A. Mannie, July 3, 1888, No. 385,562.

What I claim is—

The process herein described for the manufacture of the pyrotechnic compound set forth, said process consisting in dissolving picric acid in hot water, adding carbonate of magnesia thereto to form a solution of picrate of magnesia, then dissolving nitrate of potash in water, and mingling the latter solution with the former, producing a precipitate consisting of a picrate of potash, $(C_6H_2(NO_2)_3OK,)$ reducing said precipitate to a granular condition, and drying, substantially as described.

In testimony whereof I have affixed my signature in presence of two witnesses.

ANTONIO DEL GRANDE.

Witnesses:
JAMES A. RUTHERFORD,
CHAS. B. TILDEN.